United States Patent Office 2,727,030
Patented Dec. 13, 1955

2,727,030

METHOD OF SULFURIZING UNSATURATED HYDROCARBONS

Helen Sellei Beretvas, Chicago, Ill., assignor to Standard Oil Company, Chicago, Ill., a corporation of Indiana No Drawing. Application May 9, 1951,
Serial No. 225,453

9 Claims. (Cl. 260—139)

This invention relates to improvements in the sulfurization of unsaturated hydrocarbons. In particular, it relates to the treatment of olefin polymers with sulfur chloride in the presence of a small amount of water. More particularly it relates to the treatment of olefin polymers with sulfur chloride in the presence of a small amount of water and a small amount of a phosphorus sulfide.

An object of the present invention is to produce sulfurized hydrocarbons which have light color and high stability at relatively high temperatures.

Another object is to provide a method which permits relatively short reaction times for the production of sulfurized hydrocarbons of light color and high stability.

A further object is to produce sulfurized hydrocarbons suitable for use as additives in lubricating oils, particularly useful for imparting extreme pressure characteristics to the oil.

Other objects and advantages will be apparent from the following description of this invention.

Sulfur chloride has been employed as an agent for sulfurizing organic hydrocarbons for many years. In particular, the use of sulfur chloride for sulfurizing olefin polymers is a well known expedient. In U. S. 2,152,828, for example, the sulfurization of isobutylene polymers with $S_2Cl_2$ to produce a chlorine and sulfur containing material, useful as an extreme pressure additive in lubricating oils is described. Sulfurized polymers, prepared by treatment with $S_2Cl_2$ alone, however, tend to precipitate a substantial amount of sulfur and to lose chlorine (as hydrogen chloride) upon standing. In addition, preparation of light colored sulfurized products may be accomplished only with great difficulty when sulfur chloride alone is employed. It has now been found that various hydrocarbons containing some degree of unsaturation, particularly olefin polymers, can be reacted readily with sulfur chloride to produce stable materials high in sulfur and chlorine content which have excellent color if water is present in addition to sulfur chloride in the reaction mixture. Furthermore, if a small amount of a phosphorus sulfide is present, in addition to the sulfur chloride and water, products of even greater stability and clarity are obtained.

In accordance with the present invention unsaturated hydrocarbons containing at least one double bond in a linear chain, such as substantially saturated polymers prepared from acyclic olefins, mono-olefins, alkenylated aromatics and the like are treated with a sulfur chloride in the presence of a small amount of water and a small amount of a phosphorus sulfide. The invention will be described with particular reference to the treatment of substantially saturated butylene polymers prepared, for example, according to the process for polymerizing gaseous olefins claimed in Evering et al. U. S. 2,407,873 wherein an $AlCl_3$-hydrocarbon complex catalyst is employed. Polymers having some degree of unsaturation prepared with the same or different catalyst from the same or a different olefin may likewise be treated according to this invention, as may various monomeric olefins such as butene, octene, cetene and the like. While those polymers having a molecular weight below about two thousand, preferably below about one thousand, have been found to yield excellent extreme pressure additives for lubricating oils when treated according to the present invention, it should be understood that the sulfurization technique herein described is applicable to a broad range of polymers having molecular weights as high as 300,000 or more. Such higher molecular weight materials may likewise be employed as additives to lubricating oils to impart valuable characteristics, e. g. oiliness, extreme pressure resistance, etc.

The sulfurization according to the present invention is accomplished by reacting the aforementioned polymers, or other olefins or mixtures thereof, with 5 to 50 volume percent, preferably 10 to 30 volume percent of a sulfur chloride, in the presence of from 1 to about 50 volume percent, preferably 5 to 25 volume percent, of added water at a temperature of from about 80° F. to about 150° F. and preferably from about 95° F. to about 125° F. for a period of time of from about one-quarter hour to about six hours, and preferably from about one-half to three hours. The amount of phosphorus sulfide which may be employed is that which is sufficient to substantially improve the color but less than that which results in precipitation of a substantial amount of sulfur from the product upon standing. An amount of from 1 to about 15 weight percent, preferably from 2 to 9 weight percent, of phosphorus sulfide has been found most suitable for this purpose. Although the use of greater amounts of phosphorus sulfide or water is not detrimental to the excellent color of the product, the removal of excess sulfur or water is a problem which can readily be avoided by operating within the preferred ranges. In carrying out the sulfurization I prefer to add the sulfur chloride and water simultaneously, but separately, to the material to be sulfurized. When the reaction is complete it is necessary to raise the temperature of the reaction mixture in order to drive off the water. When phosphorus sulfide is employed it is preferred to mix it initially with the material to be sulfurized prior to the addition of sulfur chloride and water. A product prepared in the presence of a phosphorus sulfide may be heated to a temperature as high as about 300° F. without substantially affecting the color. When no phosphorus sulfide is present the temperature to which the product may be heated, e. g. to remove the water, is somewhat lower, i. e., no higher than about 250° F.

The sulfurization also may be carried out by adding the sulfur chloride to the mixture of unsaturated materials and water, or on the other hand such compounds may be added to the mixture of sulfur chloride and water. In the former case, the sulfur chloride should be added slowly, while in the latter case, special precaution should be taken to provide adequate cooling because the reaction is particularly vigorous. The sulfurization can also be carried out by adding water to the mixture of sulfur chloride and unsaturated material; however, in this case, the sulfurized product is usually darker than that obtained by other techniques. In any of these techniques, when employing a phosphorus sulfide, it is preferred to mix the same with the hydrocarbon before proceeding with the reaction. In the preferred method, the sulfur chloride addition can be completed in about one hour. The heat of reaction of sulfur chloride and hydrocarbon is not great but a rapid introduction of sulfur chloride should be avoided. Incremental addition permitting each increment of $S_2Cl_2$ to react with the polymer is most preferable. It has been found desirable to add an antifoam agent such as a silicone polymer or other suitable material to prevent undue turbulence and foaming of the reaction mixture. The sulfur chloride employed may be any of the usual sulfur chlorides, such as sulfur monochloride ($S_2Cl_2$), sulfur dichloride ($SCl_2$), or mixtures thereof, preferably sulfur monochloride. The phosphorus sulfide employed is preferably phosphorus pentasulfide ($P_2S_5$) but the other usual phosphorus sulfides such as $P_4S_3$ or $P_2S_3$ may likewise be employed.

The sulfurized product obtained in the manner described contains some so-called corrosive sulfur and chlorine, and for uses wherein the presence of corrosive sulfur and chlorine is not detrimental or objectionable the product obtained in the sulfurization reaction can be used as such, after neutralization with an alkaline reagent such as an alkali metal or alkaline earth oxide, hydroxide, or carbonate, for example NaOH, $Na_2CO_3$, CaO, $K_2CO_3$, etc. The alkaline reagent is preferably added in solid form, although solutions thereof can be used. The neutralized product can then be taken up in a low boiling hydrocarbon solvent, preferably aliphatic hydrocarbon, such as hexane, naphtha, etc. separated from the hydrocarbon insoluble products and recovered by evaporation or distillation of the solvent. With low molecular weight polymers the addition of solvent is unnecessary, the neutralized product being decanted and filtered.

If the presence of corrosive sulfur is objectionable or detrimental to the intended use of the sulfurized product the latter can be freed of the corrosive sulfur by subjecting the same to a so-called deactivation step. To obtain a non-corrosive product the sulfurized product, either after neutralization as above described or without prior neutralization, is refluxed with a solution containing about 5 percent to about 50 percent of an alkali metal sulfide, such as sodium sulfide or an alkali hydroxide such as sodium hydroxide; a low molecular weight aliphatic alcohol, such as isopropyl alcohol, ethyl alcohol, butyl alcohol, and the like, and water. Whereas the use of alcohol is desirable it is not essenial. The solution is refluxed for a period of from about one hour to about five hours, and preferably for about three hours. A suitable deactivating solution is one containing about 18 grams of anhydrous sodium sulfide, 34 cubic centimeters of isopropyl alcohol, and 100 cubic centimeters of water for each 100 grams of the sulfurized product. Deactivation of a previously neutralized sulfurized product can be accomplished by refluxing the entire neutralized reaction mass with the alcoholic solution of the alkali metal sulfide or hydroxide without separating the neutralized hydrocarbon soluble fractions from the insoluble fractions. After refluxing for the desired period, approximately an equal volume of a low boiling hydrocarbon solvent, such as hexane or a low boiling naphtha such as a petroleum naphtha boiling below about 360° F., is added, if necessary, to the refluxed solution and the mixture allowed to settle for several hours to permit stratification into two distinct layers, the upper containing the deactivated sulfurized product. The deactivated product is washed free of alkali and recovered by distilling off the hydrocarbon diluent or by other suitable means. The deactivation step also removes chlorine from the sulfurized product, the extent of dechlorination being dependent upon the amount of deactivator, i. e., $Na_2S$ or NaOH.

To control the rate of reaction it is often desirable to dilute the unsaturated compound with a diluent such as a substantially saturated hydrocarbon solvent, for example, a petroleum naphtha, hexane or other relatively low-boiling hydrocarbon solvent, i. e., boiling below about 360–370° F.; this is particularly desirable with the heavier polymers. Where it is not essential that the diluent or solvent be removed from the sulfurized product, higher boiling material, such as a viscous hydrocarbon oil, can be used as the diluent.

The herein described method of sulfurizing unsaturated hydrocarbonaceous materials will be readily understood from the following examples, which are given by way of illustration and are not intended as limiting the scope of the invention.

EXAMPLE I

Two hundred grams of a butylene polymer having a mean molecular weight of about 330 and an iodine number of about 53 were reacted with 16 volume percent of $S_2Cl_2$, added incrementally over a period of about one and one-quarter hours at a temperature of from about 86° F. to about 113° F. At the end of the sulfurization period the reaction product was neutralized with 15 weight percent sodium carbonate and diluted with hexane. After removal of the diluent a dark, sulfurized product, having a sulfur content of 10.1 percent, a chlorine content of 2.2 percent and a true color of 1800, was recovered.

EXAMPLE II

One thousand grams of polymer of the same type treated in Example I were reacted with 16 volume percent $S_2Cl_2$ and 10 volume percent water at a temperature of from about 86° F. to about 107° F. for about two hours. The incremental addition of $S_2Cl_2$ and water was carried out separately but simultaneously. The reaction product was neutralized with 15 weight percent of sodium carbonate and diluted with hexane. After removing the diluent a sulfurized product having a sulfur content of 10.4 percent, a chlorine content of 2.1 percent and a true color of 736 was obtained.

EXAMPLE III

Two hundred grams of polymer of the same type treated in Example I were mixed with 5 percent $P_2S_5$ by weight and the mixture was reacted with 16 volume percent $S_2Cl_2$ at an initial temperature of about 86° F. During the course of the incremental addition of $S_2Cl_2$, which consumed about one hour, the temperature rose to about 110. It was further heated for two hours during which the temperature rose to about 250° F. When the reaction was complete the product was neutralized with 15 weight percent sodium carbonate and diluted with hexane. After removing the diluent a dark product having a sulfur content of 12.9 percent, a chlorine content of 1.4 percent and a true color of 1920 was recovered.

EXAMPLE IV

Two hundred grams of polymer of the same type treated in Example I were mixed with 1 percent by weight of $P_2S_5$, and the mixture was reacted with 16 volume percent $S_2Cl_2$ and 10 volume percent water, the incremental addition of which being carried out separately but simultaneously. The sulfurization temperature was between about 86° and 124° F. After about sixty minutes the temperature was raised to about 260° F. to drive off all water. When the water was removed, the sulfurized product was neutralized with 15 weight percent sodium carbonate and diluted with hexane. After removal of the diluent a dark product having a sulfur content of 10.5 percent, a chlorine content of 1.4 percent and a true color of 960 was recovered.

EXAMPLE V

Two hundred grams of polymer of the same type treated in Example I were mixed with 2 percent by weight of $P_2S_5$ and the mixture was reacted with 16 volume percent $S_2Cl_2$ and 10 volume percent water. The incremental addition of $S_2Cl_2$ and water took about one hour, these materials being added simultaneously but separately. The sulfurization temperature was approximately the same as in Example IV and the water was driven off at about 260° F. After removing the water the product was neutralized with 15 weight percent sodium carbonate and diluted with hexane. A sulfurized product having a true color of 528, a sulfur content of 10.4 and a chlorine content of 1.12 was recovered after removal of the diluent.

EXAMPLE VI

Two hundred grams of polymer of the same type treated in Example I were mixed with 5 percent by weight of $P_2S_5$ and the mixture was reacted with 16 volume percent $S_2Cl_2$ and 10 volume percent water. The incremental addition of $S_2Cl_2$ and water was carried out separately but simultaneously, taking about twenty minutes. The sulfurization temperature was approximately the same as in Example IV and the water was removed at about 248° F. The sulfurized product, freed from water was neutralized with 15 weight percent sodium carbonate and diluted with hexane. A product having a sulfur content of 11.3 percent, a chlorine content of 1.2 percent and a true color of 232 was recovered after the diluent was removed.

EXAMPLE VII

One thousand grams of polymer of the same type treated in Example I were mixed with 5 percent by weight of $P_2S_5$ and the mixture was reacted with 16 volume percent $S_2Cl_2$ and 3 volume percent water. The incremental addition of $S_2Cl_2$ and water was carried out separately but simultaneously, taking about one hour. The sulfurization temperature was approximately the same as in Example IV, and the water was driven off by raising the temperature to about 244° F. The sulfurized product, freed from water, was then neutralized with 15 weight percent of sodium carbonate and diluted with hexane. A product having a sulfur content of 11.6 percent, a chlorine content of 1.3 percent and a true color of 480 was recovered after removal of the diluent.

EXAMPLE VIII

Two hundred grams of polymer of the same type treated in Example I were mixed with 10 percent by weight of $P_2S_5$ and the mixture was reacted with 16 volume percent $S_2Cl_2$ and 10 volume percent water. The incremental addition of water and $S_2Cl_2$ was carried out separately but simultaneously over a period of about eighteen minutes. The temperature of sulfurization was approximately that set forth in Example IV and the water was driven off at a temperature of about 264° F. The sulfurized product, freed from water, was then neutralized with 15 weight percent sodium carbonate and diluted with hexane. A product was recovered after removal of the diluent which contained 11.0 percent sulfur, 0.5 percent chlorine and had a true color of 368. Upon standing, the product was observed to precipitate a small amount of sulfur.

EXAMPLE IX

Two hundred grams of polymer of the same type treated in Example I were mixed with 5 percent by weight of $P_2S_5$ and the mixture was reacted with 16 volume percent $S_2Cl_2$ and 5 volume percent water. The incremental addition of water and $S_2Cl_2$ was carried out separately but simultaneously over a period of about 10 minutes. The temperature of sulfurization was from about 82° F. to about 132° F. after which the product was heated for three hours at a temperature of from about 200° F. to 275° F. to remove the water. The product was then neutralized with 15 percent $Na_2CO_3$. After decantation the product was recovered having a true color of 368, a sulfur content of 11.7 percent and a chlorine content of 1.77 percent.

EXAMPLE X

Two hundred grams of polymer of the same type treated in Example I were mixed with 5 percent by weight of $P_2S_5$ and the mixture was reacted with 10 percent by volume of $S_2Cl_2$ and 15 volume percent water. The incremental addition of water and $S_2Cl_2$ was carried out separately but simultaneously over a period of about fifty minutes at a temperature of about 125° F. The water was driven off by heating for 3 hours at a temperature of about 266° F. After neutralization with 15 percent sodium carbonate the product was diluted with hexane. A product was recovered after removal of the diluent which contained 6.1 percent sulfur, 0.61 percent chlorine and had a true color of 300.

EXAMPLE XI

Two hundred grams of polymer of the same type treated in Example I were mixed with 5 percent by weight of $P_2S_5$ and the mixture was reacted with 25 volume percent surfur chloride and 25 volume percent water. The incremental addition of water and sulfur chloride was carried out separately but simultaneously over a period of thirty minutes at a temperature of from about 130° F. to about 140° F. The product was freed from water by heating for 3 hours at a temperature of about 266° F. The product was then neutralized with $Na_2CO_3$ and diluted with hexane. After removing the diluent the product was recovered which contained 13.9 percent sulfur and 0.88 percent chlorine with a true color of 736.

EXAMPLE XII

Two hundred grams of polymer of the same type treated in Example I were mixed with 5 percent $P_4S_3$ and the mixture was reacted with 16 volume percent $S_2Cl_2$ and 5 percent by volume of water. The incremental addition of water and $S_2Cl_2$ was carried out separately but simultaneously over a period of about one hour at a temperature of about 97° F. Water was removed by raising the temperature of the product to about 275° F. for an additional hour. The product was neutralized with 15 percent $Na_2CO_3$ after it was decanted to give a product containing 9 percent sulfur, 0.85 percent chlorine and having a true color of 132.

EXAMPLE XIII

Two hundred grams of polymer of the same type treated in Example I were mixed with 2 percent by weight of $P_4S_3$ and the mixture was reacted with 16 volume percent $S_2Cl_2$ and 3 volume percent water. The incremental addition of water and $S_2Cl_2$ was carried out separately but simultaneously over a period of about one hour at a temperature of about 132° F. Water was removed from the product by heating to a temperature of about 275° F. for about three hours. After neutralization with about 15 percent sodium carbonate the product was decanted. The product contained 11 percent sulfur, 1 percent chlorine and had a true color of 600. The sulfurized product was then deactivated by dividing it in half and refluxing one portion with a solution of 18 percent by weight of $Na_2S$, 100 percent by volume of $H_2O$ and 32 percent by volume of isopropyl alcohol and refluxing the other with a solution of 35 percent by weight of NaOH 32 volume percent of isopropyl alcohol and 100 percent by volume of $H_2O$. The deactivated products contained 6.24 percent sulfur and 0.20 percent chlorine and 6.04 percent sulfur and 0.20 percent chlorine, respectively.

Whereas there is no satisfactory analytical measurement of product stability it has been found that acid odor is always very strong with products prepared with $S_2Cl_2$ alone whereas products prepared in the presence of water have a pleasant odor indicating very little if any decomposition to HCl over extended periods of a year or more.

From the above examples (and the tabulation of the data included therein which is set forth below in Table 1) it is apparent that the presence of water, when sulfurizing with $S_2Cl_2$, is surprisingly advantageous in producing a product of improved color. Equally apparent is the even greater improvement obtained by having $P_2S_5$ also present in the reaction mixture.

*Table 1*

| Run No.[1] | $S_2Cl_2$ Vol., Parts[2] | $H_2O$ Vol., Parts[2] | Phosphorus Sulfide Parts[3] | Percent S | Percent Cl | Color (true) |
|---|---|---|---|---|---|---|
| I | 16 | 0 | 0 | 10.1 | 2.2 | 1,800 |
| II | 16 | 10 | 0 | 10.6 | 1.6 | 736 |
| III | 16 | 0 | 5 | 12.9 | 1.4 | 1,920 |
| IV | 16 | 10 | 1 | 10.5 | 1.4 | 960 |
| V | 16 | 10 | 2 | | | 528 |
| VI | 16 | 10 | 5 | 11.3 | 1.2 | 232 |
| VII | 16 | 3 | 5 | 11.6 | 1.3 | 480 |
| VIII | 16 | 10 | 10 | 11.0 | 0.5 | 368 |
| IX | 16 | 5 | 5 | 11.7 | 1.77 | 368 |
| X | 10 | 15 | 5 | 6.1 | 0.6 | 300 |
| XI | 25 | 25 | 5 | 13.9 | 0.88 | 736 |
| XII | 16 | 5 | [4]5 | 9. | 0.85 | 132 |
| XIII | 16 | 3 | [4]2 | 11.0 | 1.0 | 600 |

[1] The run number corresponds to example number.
[2] Based on 100 volume parts of butylene polymer.
[3] By weight ($P_2S_5$ unless otherwise indicated).
[4] $P_4S_3$.

The true color values reported herein are obtained by determining the dilution necessary to get an ASTM color between 4 and 5 by using a colorless diluent, e. g. naphtha, and calculating the true color according to the following table.

TRUE COLORS FROM ASTM COLORS

| Dilution[1] Ratio | ASTM Color | | | | |
|---|---|---|---|---|---|
| | 5 | 4¾ | 4½ | 4¼ | 4 |
| 1:1[2] | 75 | 60 | 46 | 33 | 29 |
| 1:2 | 150 | 120 | 92 | 66 | 58 |
| 1:4 | 300 | 240 | 184 | 132 | 116 |
| 1:8 | 600 | 480 | 368 | 264 | 232 |
| 1:16 | 1,200 | 960 | 736 | 528 | 464 |
| 1:32 | 2,400 | 1,920 | 1,472 | 1,056 | 928 |
| 1:64 | 4,800 | 3,840 | 2,944 | 2,112 | 1,856 |

[1] Sample:sample plus diluent.
[2] No dilution. True color equivalent of ASTM color.

The above table (other than the values for true color equivalents at no dilution) was calculated from the formula:

True color of unknown = True color equivalent of ASTM color between 4 and 5 times the dilution of unknown required to obtain that ASTM color between 4 and 5.

Thus, if a dilution ratio of 1:16 is required to obtain an ASTM color of 5 the true color would be 1200, i. e. 16×75=1200. The true color equivalents of ASTM colors between 4 and 5 were obtained from the chart on page 165 of "Industrial and Engineering Chemistry," February 1926.

The sulfurized polymers of the present invention are suitable in hydrocarbon oils, such as, for example, natural mineral lubricating oils and synthetic hydrocarbon lubricating oils, and when compounded with such oils are effective in imparting extreme pressure properties thereto. The extreme pressure properties imparted to such lubricating oils is shown by data in Table 2, in which tests on the Timken machine is tabulated. These data were obtained on a blend of 90 percent mineral lubricating oil having a SUS viscosity at 100° F. of about 180 seconds and 10 percent sulfurized polymer; the sulfurization being carried out in accordance with the present invention.

*Table 2*

| Oil | Timken | |
|---|---|---|
| | Pass | Fail |
| Control | 7 | 10 |
| Control +10% of product of Example IV (supra) | 21 | 24 |
| Control +10% of product of Example V (supra) | 36 | 39 |
| Control +10% of product of Example VI | 21 | 24 |
| Control +10% of product of Example II | 27 | 30 |
| Control +10% of product of Example VIII | 30 | 33 |

In comparative tests on the Timken machine sulfurized polymer prepared according to the present invention has performed substantially the same as sulfurized sperm which is a commonly employed commercial additive of considerably greater cost.

While I have described in detail the preferred embodiments of the present invention, it will be apparent to those skilled in the art that certain modifications thereof are possible so that it should be understood that the invention is not limited to the details herein above set forth, but includes within its scope such modificaitons as come within the spirit of the appended claims.

I claim:
1. The method which comprises reacting from about 10 to about 25 volume percent of $S_2Cl_2$ with an unsaturated butylene polymer in the presence of from about 1 to about 50 volume percent of water and of from 2 to 9 volume percent of $P_2S_5$ at a temperature of from about 80° to about 150° F. for at least about one-half hour, neutralizing the product with a basic reagent and recovering the neutralized product.

2. The method which comprises reacting from about 10 to about 25 volume percent of $S_2Cl_2$ with an unsaturated butylene polymer in the presence of from about 1 to about 50 volume percent of water and of from 2 to 9 volume percent of $P_2S_5$ at a temperature of from about 80° to about 150° F. for at least about one-half hour, removing the water by vaporizing the same at the end of the reaction period, neutralizing the product with a basic reagent and recovering the neutralized product.

3. The method which comprises reacting from about 10 to about 25 volume percent of $S_2Cl_2$ with an unsaturated butylene polymer in the presence of from about 1 to about 50 volume percent of water and of from 0 to 9 volume percent of $P_2S_5$ at a temperature of from about 80° to about 150° F. for at least about one-half hour, removing the water by vaporizing the same at the end of the reaction period, neutralizing the product with a basic reagent, deactivating the neutralized sulfurized product by refluxing the same with an alcoholic solution of an alkali metal compound and recovering the deactivated sulfurized product.

4. The method of claim 3 wherein the alkali metal compound is selected from the group consisting of $Na_2S$ and NaOH.

5. The sulfurized product prepared according to the method of claim 3.

6. The method of sulfurizing an unsaturated butylene polymer which comprises reacting said polymer with from about 5% to about 50% by volume of a sulfur chloride in the presence of from 1% to about 50% by volume of water at a temperature in the range of from about 80° F. to about 150° F.

7. The method of claim 6 wherein an amount of a phosphorus sulfide, not in excess of 15% by weight, is present in the reaction zone.

8. The method of sulfurizing an unsaturated butylene polymer which comprises reacting said polymer with from about 5% to about 50% by volume of a sulfur chloride in the presence of from 1% to about 50% by volume of water and from about 1% to about 15% by weight of a phosphorus sulfide at a temperature in the range of from about 80° F. to about 150° F.

9. The method of sulfurizing an unsaturated butylene polymer which comprises reacting said polymer with from about 5% to about 50% by volume of a sulfur chloride in the presence of from 1% to about 50% by volume of water at a temperature in the range of from about 80° F. to about 150° F. and removing water by vaporizing the same at the end of the reaction period at a temperature not in excess of about 250° F.

References Cited in the file of this patent

UNITED STATES PATENTS

| | | |
|---|---|---|
| 2,337,473 | Knowles et al. | Dec. 21, 1943 |
| 2,405,607 | Rogers | Aug. 13, 1946 |
| 2,405,608 | Rogers | Aug. 13, 1946 |
| 2,534,217 | Bartleson | Dec. 19, 1950 |
| 2,540,580 | Heinrich | Feb. 6, 1951 |
| 2,566,398 | Bartleson | Sept. 4, 1951 |
| 2,621,172 | Teeter | Dec. 9, 1952 |